(12) United States Patent
Matsushita et al.

(10) Patent No.: US 11,735,145 B2
(45) Date of Patent: Aug. 22, 2023

(54) PERIPHERY DISPLAY DEVICE FOR WORK MACHINE

(71) Applicant: SUMITOMO HEAVY INDUSTRIES CONSTRUCTION CRANES CO., LTD., Tokyo (JP)

(72) Inventors: Tatsuya Matsushita, Aichi (JP); Kohei Honjo, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 72 days.

(21) Appl. No.: 17/212,734

(22) Filed: Mar. 25, 2021

(65) Prior Publication Data

US 2021/0304708 A1 Sep. 30, 2021

(30) Foreign Application Priority Data

Mar. 26, 2020 (JP) .................................. 2020-055367

(51) Int. Cl.
| | |
|---|---|
| *G09G 5/373* | (2006.01) |
| *E02F 9/26* | (2006.01) |
| *B60K 35/00* | (2006.01) |
| *E02F 3/46* | (2006.01) |

(52) U.S. Cl.
CPC .............. *G09G 5/373* (2013.01); *B60K 35/00* (2013.01); *E02F 3/46* (2013.01); *E02F 9/261* (2013.01); *B60K 2370/176* (2019.05); *B60R 2300/607* (2013.01); *B60Y 2200/412* (2013.01); *E02F 9/264* (2013.01); *G09G 2340/04* (2013.01); *G09G 2354/00* (2013.01); *G09G 2380/10* (2013.01)

(58) Field of Classification Search
CPC ............... G09G 5/373; G09G 2340/04; G09G 2354/00; G09G 2380/10; B60K 35/00; B60K 2370/176; B60K 2370/191; E02F 3/46; E02F 9/261; E02F 9/264; B60Y 2200/412; B66C 23/36; B66C 13/16; B66C 13/54; B66C 23/62; B66C 23/88
See application file for complete search history.

(56) References Cited

U.S. PATENT DOCUMENTS

| | | | | | |
|---|---|---|---|---|---|
| 1,773,337 | A | * | 8/1930 | Barlow .................. | G09B 29/10 224/276 |
| 2007/0083819 | A1 | * | 4/2007 | Shoemaker ........... | G06T 3/0018 715/767 |
| 2008/0309784 | A1 | * | 12/2008 | Asari ....................... | B60R 1/00 348/222.1 |
| 2013/0162830 | A1 | * | 6/2013 | Mitsuta .................... | H04N 7/18 348/148 |

(Continued)

FOREIGN PATENT DOCUMENTS

JP        2002-074929 A        3/2002

*Primary Examiner* — Bryan Earles
(74) *Attorney, Agent, or Firm* — Michael Best & Friedrich LLP (57) ABSTRACT

There is provided a periphery display device for a work machine, which displays a bird's-eye view image around the work machine. A display magnification of a region between a peripheral line having a turning radius of the work machine and an offset peripheral line surrounding the peripheral line is different from a display magnification of a region inside the peripheral line.

15 Claims, 7 Drawing Sheets

(56) References Cited

U.S. PATENT DOCUMENTS

| | | | | |
|---|---|---|---|---|
| 2014/0152774 A1* | 6/2014 | Wakabayashi | ........... | H04N 7/18 |
| | | | | 348/46 |
| 2015/0175071 A1* | 6/2015 | Ishimoto | .................. | H04N 7/18 |
| | | | | 348/148 |
| 2017/0089042 A1* | 3/2017 | Machida | ................. | G06V 20/58 |
| 2018/0094408 A1* | 4/2018 | Shintani | .................... | E02F 9/26 |
| 2018/0295357 A1* | 10/2018 | Okumura | .................. | E02F 9/26 |
| 2019/0191064 A1* | 6/2019 | Aihara | ................. | H04N 5/2254 |
| 2020/0231210 A1* | 7/2020 | Anderson | ............ | H04N 5/2257 |

* cited by examiner

PERIPHERY DISPLAY DEVICE FOR WORK MACHINE

RELATED APPLICATIONS

The content of Japanese Patent Application No. 2020-055367, on the basis of which priority benefits are claimed in an accompanying application data sheet, is in its entirety incorporated herein by reference.

BACKGROUND

Technical Field

Certain embodiments of the present invention relate to a periphery display device for a work machine.

Description of Related Art

In the related art, as a periphery monitoring device for a hydraulic excavator, a device which creates a bird's-eye view image, in which the hydraulic excavator is disposed at the center, from a peripheral image to output a display is illustrated. In the bird's-eye view image, two circles are drawn with respect to the turning radius of the hydraulic excavator, and a region between the two circles is set as a caution zone.

SUMMARY

According to an embodiment of the present invention, there is provided a periphery display device for a work machine, which displays a bird's-eye view image around the work machine.

A display magnification of the bird's-eye view image in a region between a peripheral line having a turning radius of the work machine and an offset peripheral line surrounding the peripheral line is different from a display magnification of the bird's-eye view image in a region inside the peripheral line.

DETAILED DESCRIPTION

When a bird's-eye view image for monitoring the periphery is created for a large work machine as in the related art, the ratio of an area, which is occupied by a region in the vicinity of the turning radius of the work machine, to that of the entire image may be small. In this case, the width of the caution zone in the vicinity of the turning radius is narrow in the bird's-eye view image, and it is difficult for a monitoring person (for example, an operator) to understand the state of the caution zone, so that the efficiency of monitoring decreases.

It is desirable to provide a periphery display device for a work machine, which efficiently monitors the periphery.

According to an embodiment of the present invention, it is possible to provide the periphery display device for the work machine, which can efficiently monitor the periphery.

Hereinafter, embodiments of the present invention will be described in detail with reference to the drawings.

One Embodiment

Figure 1:
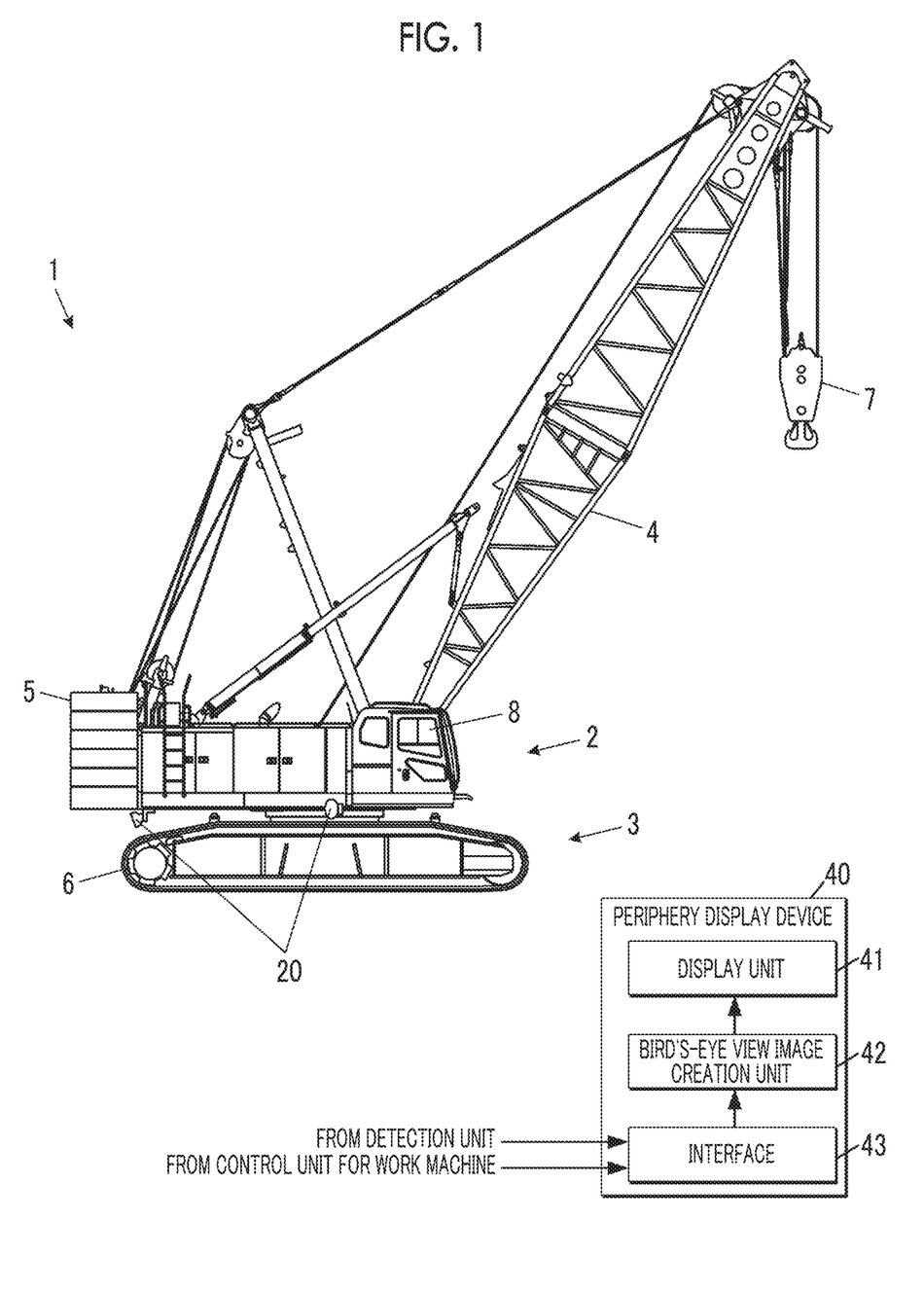
FIG. 1 is a view illustrating a work machine according to embodiments of the present invention.

FIG. 1 is a view illustrating a work machine according to an embodiment of the present invention. A work machine 1 according to an embodiment of the present invention is a mobile crane such as a crawler crane, and includes a lower traveling body 3 that move in a translation manner, an upper turning body 2 that turns with respect to the lower traveling body 3, a detection unit 20 for monitoring the periphery, and a periphery display device 40 that outputs an image for monitoring the periphery based on an output of the detection unit 20. Further, the work machine 1 includes a cab 8 provided in the upper turning body 2, a boom 4 oscillatably connected to the upper turning body 2, a hook 7 suspended from a tip part of the boom 4, a counterweight 5 mounted in a rear portion of the upper turning body 2, and the like.

The periphery display device 40 includes an interface 43 that receives information from the detection unit 20 and a control unit for the work machine 1, a bird's-eye view image creation unit 42 that creates a bird's-eye view image around the work machine 1 based on the information received by the interface 43, and a display unit 41 such as a liquid crystal monitor that outputs the created bird's-eye view image. The display unit 41 may be disposed in the cab 8, may be provided in a portable terminal for management, or may be disposed in a management center different from a worksite. The interface 43 may be disposed in the cab 8 or in a control machine room on the upper turning body 2. The bird's-eye view image creation unit 42 is a software module that is realized by the execution of a control program in a storage device by a CPU of a computer. The computer which realizes the bird's-eye view image creation unit 42 may be disposed in the cab 8 or in the control machine room on the upper turning body 2, may be a portable terminal separated from the work machine 1, or may be provided in the management center different from the worksite. When the interface 43 and the display unit 41 and the bird's-eye view image creation unit 42 are disposed at different locations, the interface 43 and the display unit 41 and the bird's-eye view image creation unit 42 may be connected to each other via wireless communication or a communication network. The detection unit 20 may include the periphery display device 40 as one component.

The work machine 1 is assembled and used at the worksite, and is disassembled and taken out after work is completed. Components to be assembled at the worksite include a crawler component (a part of a shoe or a drive mechanism) 6 of the lower traveling body 3, and the boom 4 and the counterweight 5 that are attached to the upper turning body 2.

The detection unit 20 is, for example, a scanning type distance measurement device such as light detection and ranging (LiDAR), or an imaging camera, and acquires an image (captured image, distance image, or the like) around the work machine 1. The detection units 20 may be provided at a plurality of locations on the work machine 1. The detection unit 20 acquires data for generating a peripheral image of at least a region behind and regions on the right and left of the work machine 1 from the inside to the outside of the turning radius of the work machine 1. The turning radius of the work machine 1 means the radius of a trajectory drawn by an end portion that is located the farthest from the center of turning except for the boom 4 when the upper turning body 2 turns, and in the example of FIG. 1, means the radius of a trajectory drawn by a rear end (rear end of the counterweight 5) of the upper turning body 2. In the example of FIG. 1, the turning radius is called a rear end radius.

Figure 2:
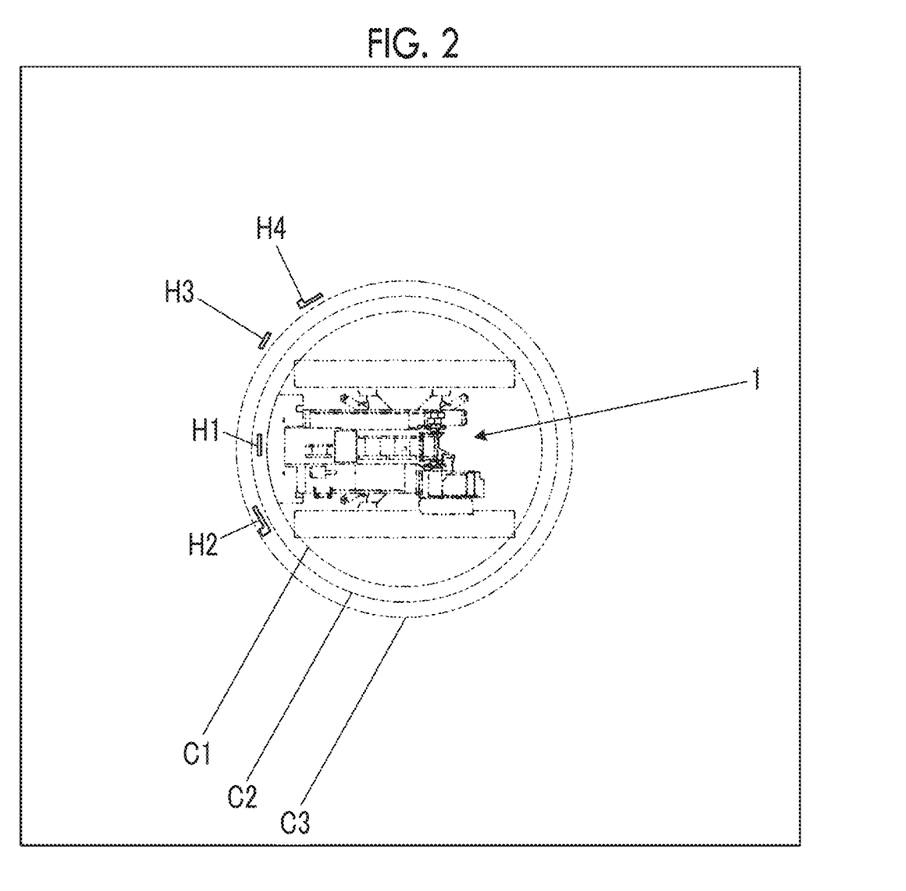
FIG. 2 is an image view illustrating a bird's-eye view image of the work machine and the periphery thereof.

FIG. 2 is an image view illustrating a bird's-eye view image of the work machine and the periphery thereof.

The bird's-eye view image creation unit 42 converts the coordinates of the data of the peripheral image, which is sent from the detection unit 20, from the coordinates of the peripheral image into the coordinates of a bird's-eye view image of the work machine 1 when seen from above, to create a bird's-eye view image around the work machine 1. FIG. 2 illustrates bird's-eye view image data obtained by converting the peripheral image such that the display magnifications of parts are the same. In the bird's-eye view image data of FIG. 2, the work machine 1, a first peripheral line C1 indicating the turning radius of the work machine 1, a second peripheral line C2 at 1 m outward from the turning radius, and a third peripheral line C3 at 2 m outward from the turning radius are illustrated by imaginary lines. At the worksite, a region between the first peripheral line C1 and the second peripheral line C2 corresponds to a warning region requiring high caution, and a region between the second peripheral line C2 and the third peripheral line C3 corresponds to a caution region requiring medium caution. The bird's-eye view image includes displays of a plurality of objects H1 to H4 detected by the detection unit 20. The objects detected by the detection unit 20 include a person such as a worker or a pedestrian, an obstacle, and the like. The first peripheral line C1 corresponds to one example of a peripheral line according to an embodiment of the present invention. The second peripheral line C2 and the third peripheral line C3 correspond to one example of an offset peripheral line according to an embodiment of the present invention.

As illustrated in FIG. 2, in the bird's-eye view image in which the parts are displayed with the same magnification, the larger the work machine 1 is, the narrower the width from the first peripheral line C1 to the third peripheral line C3 is, as compared with a region occupied by the work machine 1 on the image.

Figure 3:
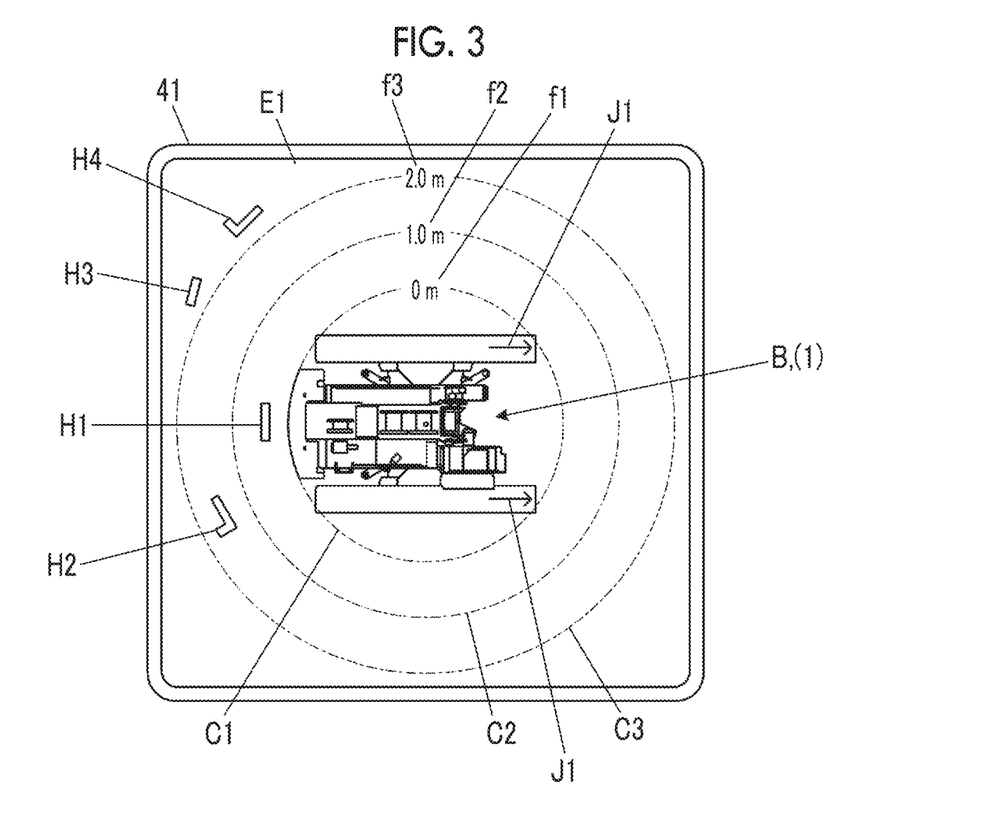
FIG. 3 is an image view illustrating a display example of a bird's-eye view image according to one embodiment.

FIG. 3 is an image view illustrating a display example of a bird's-eye view image according to one embodiment.

As illustrated in FIG. 3, the bird's-eye view image creation unit 42 creates a bird's-eye view image E1 in which the display magnification of a region inside the first peripheral line C1 is set to be two times the display magnification of a region outside the first peripheral line C1. The bird's-eye view image E1 created is output from the display unit 41. Here, the display magnification means a magnification in a radial direction of the first peripheral line C1, and for example, when a gauge is placed along the radial direction of the first peripheral line C1, it is meant that the length ratio of 1 m on the gauge inside the first peripheral line C1 and 1 m on the gauge outside the first peripheral line C1 is 1:2 on a display image.

The bird's-eye view image creation unit 42 has a picture B of the work machine 1 in advance when seen from above, and adds the picture B of the work machine 1 to the bird's-eye view image E1. The picture B of the work machine 1 is added to the bird's-eye view image E1 such that the center of turning of the upper turning body 2 overlaps the center of the first peripheral line C1, and the rear end of the upper turning body 2 overlaps the first peripheral line C1, the rear end drawing the turning radius.

Further, the bird's-eye view image creation unit 42 causes the bird's-eye view image E1 to include displays indicating the first peripheral line C1 to the third peripheral line C3, and length information f1 to f3 up to the peripheral lines C1 to C3. The displays of the first peripheral line C1 to the third peripheral line C3 are displays of concentric circles. The length information f1 to f3 is a character display indicating a radial distance from the first peripheral line C1. The length information f1 to f3 also corresponds to information that can be compared with the size of the work machine 1 to distinguish the difference in display magnification between the region inside the first peripheral line C1 and the warning region and the caution region. The length information f1 to f3 may have any display form such as a display using a scale bar as long as the distance or the display magnification between the regions can be distinguished in a one-to-one correspondence. The indications of distances corresponding to the displays of the length information f1 to f3 may be separately provided outside a screen.

According to the bird's-eye view image E1 of FIG. 3, since the width between the first peripheral line C1 and the third peripheral line C3 is doubled as compared with the region inside the first peripheral line C1, the objects H1 and H2 existing in the warning region and the caution region are displayed large and easy to distinguish. Further, the objects H3 and H4 existing in the region outside the third peripheral line C3 are also displayed large. The warning region and the caution region can be efficiently monitored with the bird's-eye view image E1 described above.

Further, since the bird's-eye view image E1 includes the displays of the first peripheral line C1 to the third peripheral line C3, a monitoring person can easily recognize a region requiring caution when the work machine 1 turns, so that the efficient monitoring of the periphery can be realized. Further, based on the length information f1 to f3 included in the bird's-eye view image E1, even though the display magnifications in the image are not the same, the monitoring person who sees the bird's-eye view image E1 can recognize how far the objects H1 to H4, which are displayed on the bird's-eye view image E1, are from the turning radius of the work machine 1, and the distances can be suppressed from being confused.

Figure 4A:
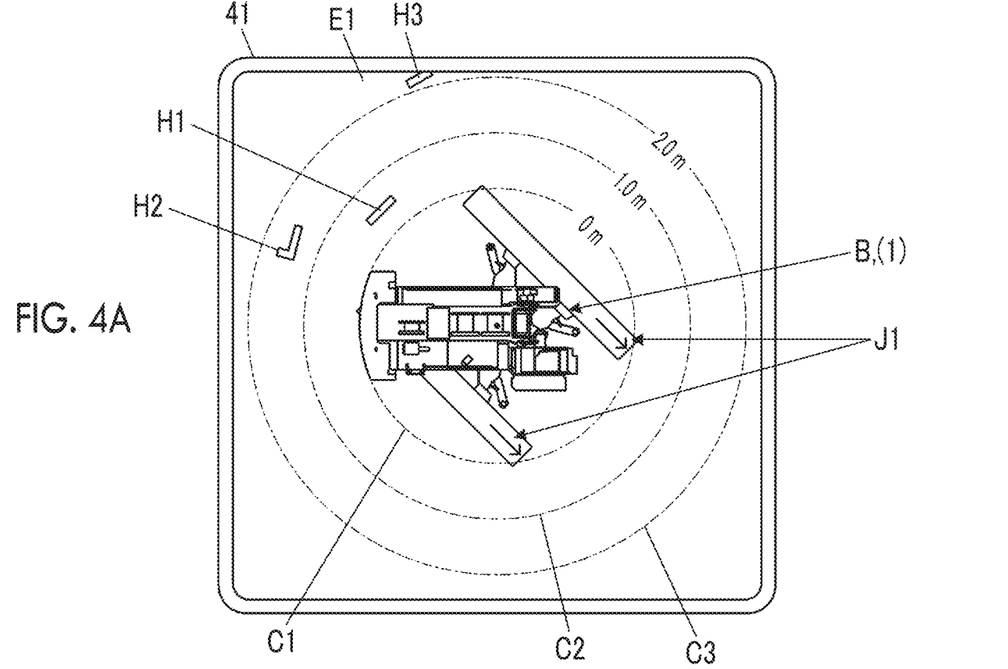
FIGS. 4A and 4B illustrate image views illustrating display examples of bird's-eye view images according to the turning angle of the work machine.
Figure 4B:
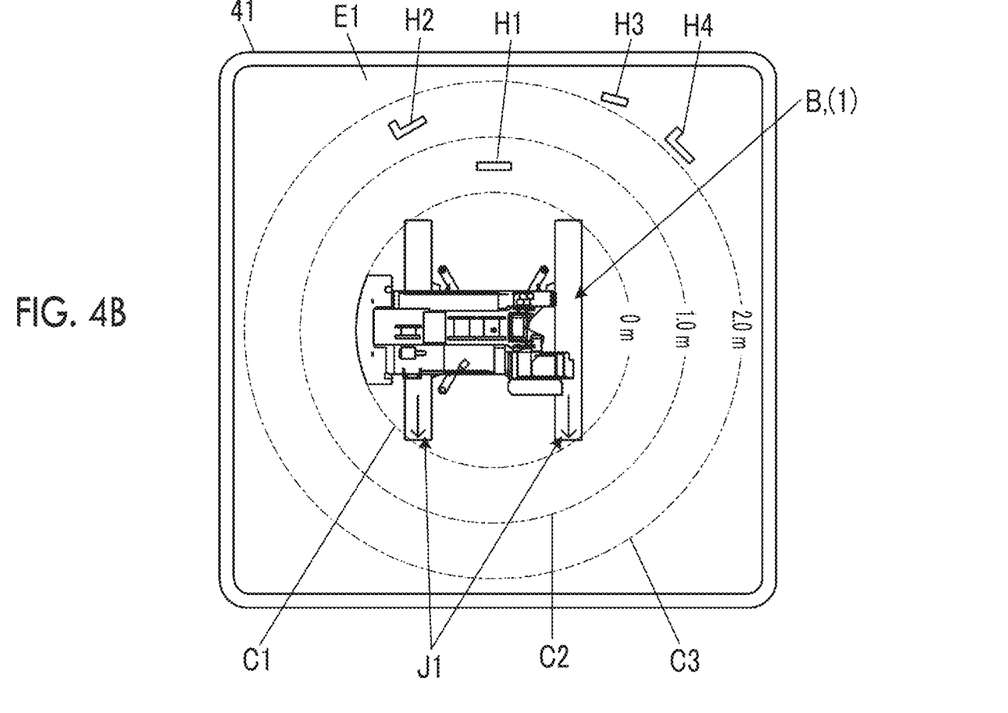

FIGS. 4A and 4B illustrate image views illustrating display examples of bird's-eye view images according to the turning angle of the work machine.

During operation of the work machine 1, the bird's-eye view image creation unit 42 changes the picture B of the work machine 1 in the bird's-eye view image E1 according to the turning of the upper turning body 2. Specifically, the picture B includes a picture of the lower traveling body 3 and a picture of the upper turning body 2, and the bird's-eye view image creation unit 42 rotates the picture of the upper turning body 2 relative to the picture of the lower traveling body 3 and a peripheral image according to the turning of the upper turning body 2. The bird's-eye view image creation unit 42 may receive information on the turning angle of the upper turning body 2 from the work machine 1 to realize the relative rotation of the picture B on the bird's-eye view image E1, or may acquire positioning information, which indicates a relative rotation angle between the upper turning body 2 and the lower traveling body 3, from one or a plurality of positioning devices attached to the work machine 1, to realize the relative rotation of the picture B.

Incidentally, the bird's-eye view image creation unit 42 may not only change the relative angle of the picture B in the bird's-eye view image E1 according to the turning status of the upper turning body 2, but also change the picture B of the work machine 1 according to various work statuses of the work machine 1 such as the angle of the boom 4, the traveling status of the lower traveling body 3, and the lifting status of a load by the hook 7.

Since the picture B of the work machine 1 is changed according to the turning status or other work statuses, an operator or a manager can identify the work status of the work machine 1 while seeing the bird's-eye view image E1. Since a point of caution in monitoring the periphery may also change depending on the work status, when the work status can be identified from the bird's-eye view image E1, the periphery can be efficiently monitored.

Further, the bird's-eye view image creation unit 42 causes the bird's-eye view image E1 to include a pattern J1 indicating a forward movement direction of the lower traveling body 3. For example, the bird's-eye view image creation unit 42 adds the pattern J1 to the picture B of the work machine 1 in an overlapping manner. Therefore, when the upper turning body 2 turns and the lower traveling body 3 in the bird's-eye view image E1 turns, the forward movement direction of the lower traveling body 3 is indicated by the pattern J1. Accordingly, when the operator causes the lower traveling body 3 to travel, the operator can see the bird's-eye view image E1 to identify a traveling direction without confusion. The pattern J1 may not indicate the forward movement direction, but indicate a rearward movement direction.

Figure 5A:
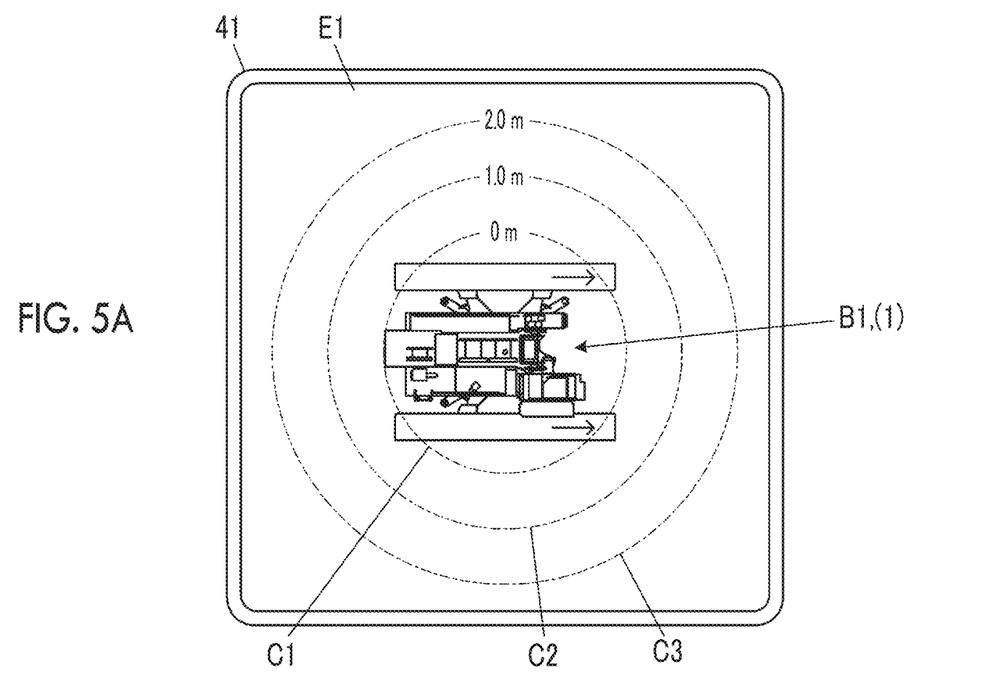
FIGS. 5A and 5B illustrate image views illustrating display examples of bird's-eye view images according to the assembly status of the work machine.
Figure 5B:
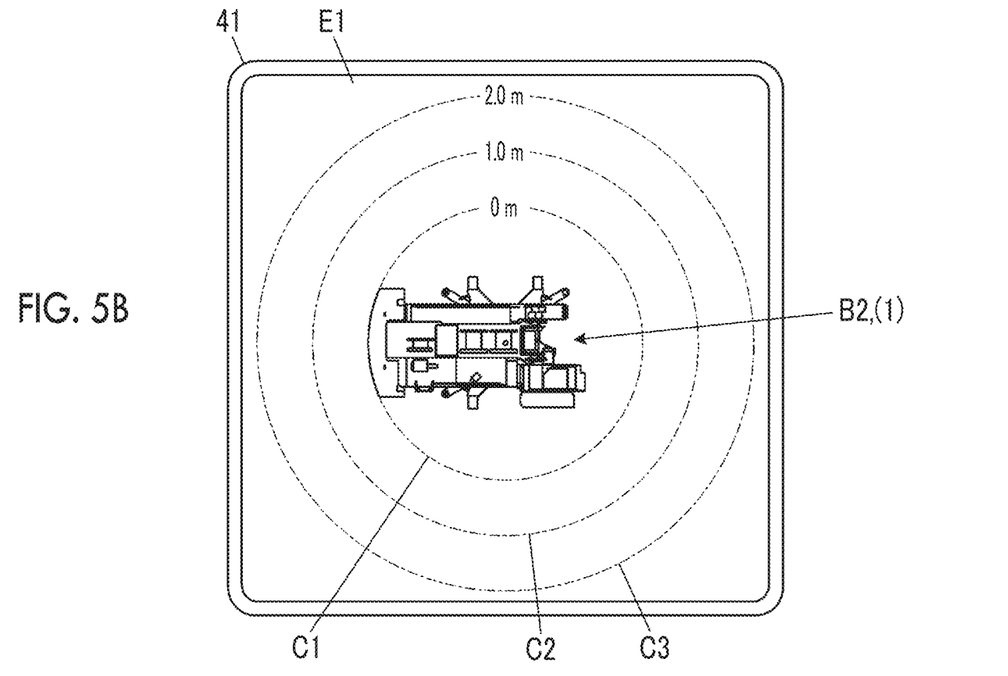

FIGS. 5A and 5B illustrate image views illustrating display examples of bird's-eye view images according to the assembly status of the work machine.

During assembly or disassembly of the work machine 1, the bird's-eye view image creation unit 42 changes the picture B according to the assembly status of the work machine 1. For example, as illustrated in FIG. 5A, in a status where the counterweight 5 is not attached, the bird's-eye view image creation unit 42 changes the picture B of the work machine 1 to a picture B1 without including the counterweight 5. In addition, as illustrated in FIG. 5B, in a status where the crawler component 6 is removed, the bird's-eye view image creation unit 42 changes the picture B of the work machine 1 to a picture B2 without including the crawler. The bird's-eye view image creation unit 42 has picture data such as the pictures B, B1, and B2, which indicates that the assembly components are removed, in advance, and receives information indicating the assembly status of the work machine 1 from a control device for the work machine 1. The bird's-eye view image creation unit 42 selects picture data of the work machine 1 based on the received information indicating the assembly status, to realize switching between the pictures B, B1, and B2 according to the assembly status.

Since switching is performed between the pictures B, B1, and B2 in the bird's-eye view image E1 according to the assembly status, the operator or the manager can identify the assembly status of the work machine 1 while seeing the bird's-eye view image E1. Since a point of caution in monitoring the periphery may also change depending on the assembly status, when the assembly status can be identified from the bird's-eye view image E1, the periphery can be efficiently monitored.

The pictures B, B1, and B2 have outer shapes according to the assembly status of the work machine 1. For example, in the picture B1 illustrating an assembly status where the position of a turning end (rear end) of the work machine 1 is close to the center of turning, namely, in the picture B1 without including the counterweight 5, similar to the actual work machine 1, the position of the turning end (rear end) is close to the center of turning.

In an assembly status where the turning radius of the work machine 1 differs, for example, in an assembly status where the counterweight 5 is removed, the bird's-eye view image creation unit 42 changes the picture B of the work machine 1 to the picture B1 corresponding thereto, and changes the sizes of the first peripheral line C1 to the third peripheral line C3 according to a small turning radius. Further, the bird's-eye view image creation unit 42 also changes the regions, of which the display magnifications are changed, in the bird's-eye view image E1 into a region inside and a region outside the first peripheral line C1 changed.

As described above, according to the assembly status of the counterweight 5 of the work machine 1, the outer shapes of the pictures B and B1 are changed, and the positions of the first peripheral line C1 to the third peripheral line C3 are changed, so that an actual turning radius according to the assembly status is reflected in the bird's-eye view image E1. Therefore, the bird's-eye view image E1 enables the efficient monitoring of the periphery according to the assembly status.

As described above, according to the periphery display device 40 of the one embodiment, the bird's-eye view image E1 which is created by the bird's-eye view image creation unit 42 to be displayed on the display unit 41 enables the efficient monitoring of the periphery.

Another Embodiment

Figure 6:
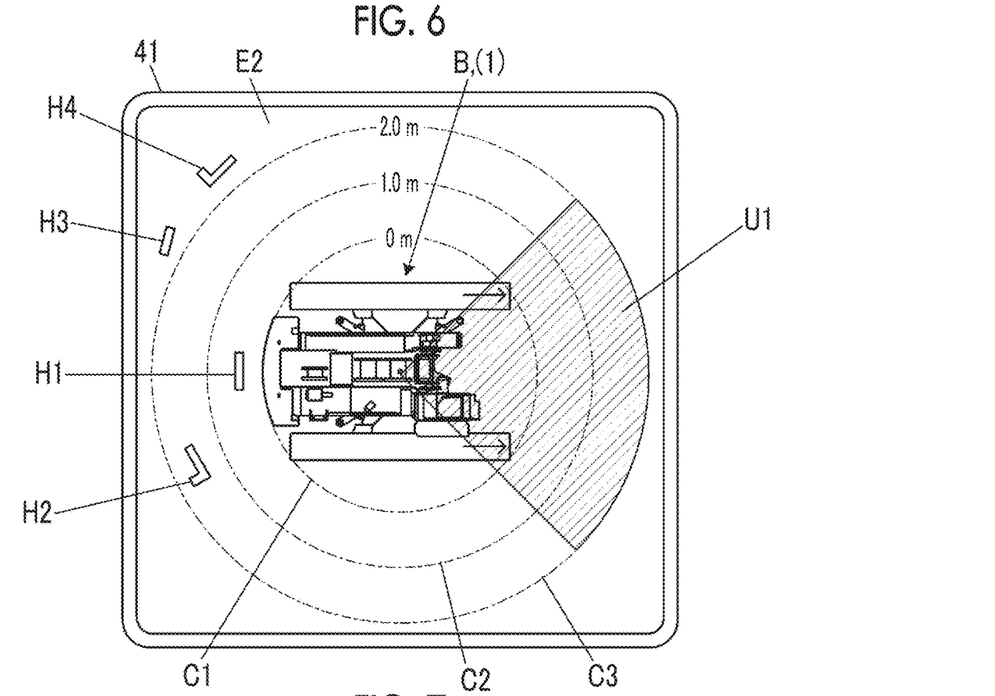
FIG. 6 is an image view illustrating a display example of a bird's-eye view image according to another embodiment.

FIG. 6 is an image view illustrating a display example of a bird's-eye view image according to another embodiment. The work machine 1 and the periphery display device 40 of another embodiment are the same as those of the one embodiment except that a bird's-eye view image E2 created by the bird's-eye view image creation unit 42 is different. Parts different from the one embodiment will be described in detail.

In addition to the bird's-eye view image E1 of the one embodiment, the bird's-eye view image creation unit 42 of the another embodiment creates the bird's-eye view image E2 having a display mode (for example, gray out) in which a non-detection region U1 outside the detection range of the detection unit 20 can be distinguished from other regions. The non-detection region U1 may be displayed only inside the third peripheral line C3 as illustrated in FIG. 6, or may be displayed to include the outside of the third peripheral line C3.

The non-detection region U1 is included in a range visible from the cab 8, and when the operator turns the upper turning body 2, the operator relies on the bird's-eye view image E2 to monitor the periphery other than the non-detection region U1, and visually monitors the periphery in the non-detection region U1. Therefore, the bird's-eye view image E1 in which the non-detection region U1 is illustrated enables the operator to visually recognize a location to be confirmed and to efficiently monitor the periphery.

Still Another Embodiment

Figure 7:
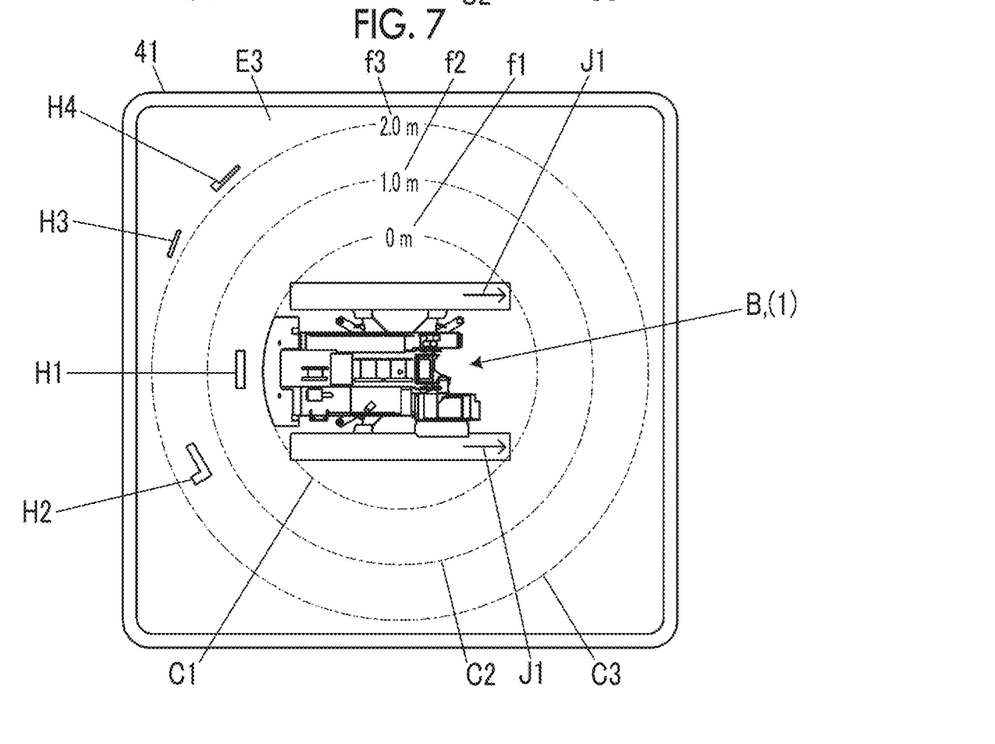
FIG. 7 is an image view illustrating a display example of a bird's-eye view image according to still another embodiment.

FIG. 7 is an image view illustrating a display example of a bird's-eye view image according to still another embodiment. The work machine 1 and the periphery display device 40 of the still another embodiment are the same as those of the one embodiment except that a bird's-eye view image E3 created by the bird's-eye view image creation unit 42 is different. Parts different from the one embodiment will be described in detail.

The bird's-eye view image creation unit 42 of the still another embodiment creates the bird's-eye view image E3 in which the display magnification of a region between the third peripheral line C3 and the first peripheral line C1 is set to be two times, and the display magnification of the region outside the third peripheral line C3 is set to be one times with respect to the display magnification of the region inside the first peripheral line C1.

According to the bird's-eye view image E3 of the still another embodiment, the objects H1 and H2 in the warning region and the caution region are displayed large and easy to distinguish, whereas the objects H3 and H4 outside the caution region are not displayed large. Therefore, only the objects H1 and H2 in the regions requiring caution are easily distinguished, so that the periphery can be efficiently monitored.

Further Embodiment

Figure 8:
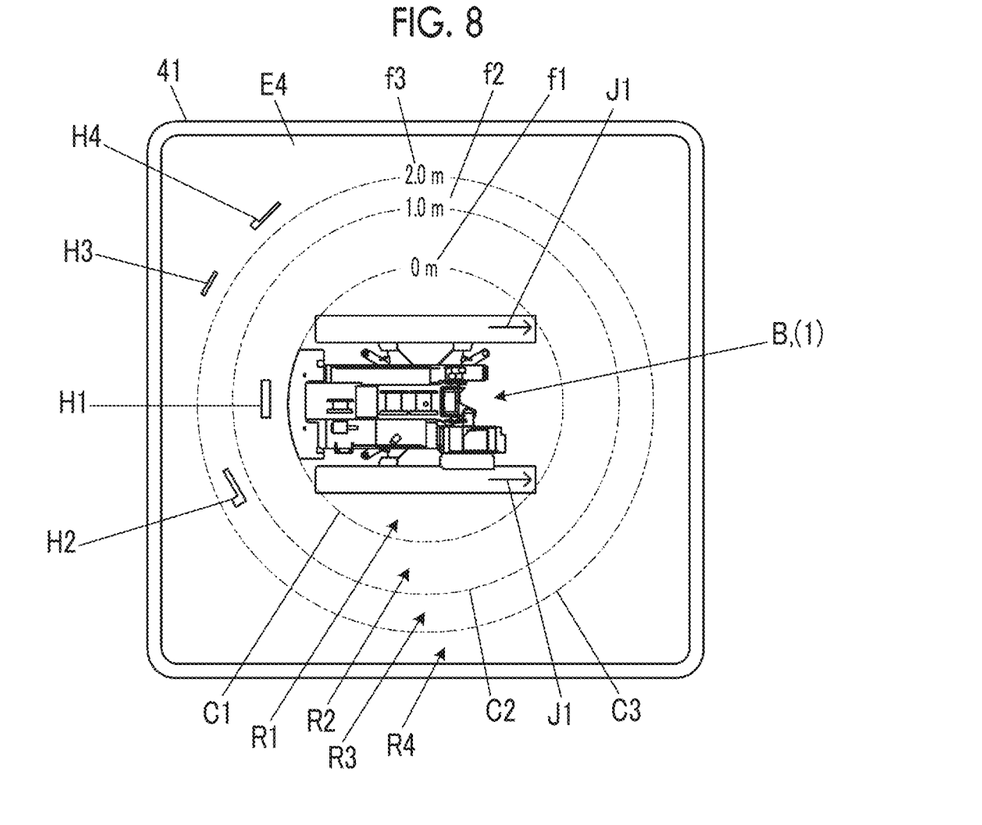
FIG. 8 is an image view illustrating a display example of a bird's-eye view image according to further embodiment.

FIG. 8 is an image view illustrating a display example of a bird's-eye view image according to further embodiment. The work machine 1 and the periphery display device 40 of the further embodiment are the same as those of the one embodiment except that a bird's-eye view image E4 created by the bird's-eye view image creation unit 42 is different. Parts different from the one embodiment will be described in detail.

The bird's-eye view image creation unit 42 of the further embodiment creates the bird's-eye view image E4 in which the display magnifications of regions, specifically, a region R1 inside the first peripheral line C1, a warning region R2 between the first peripheral line C1 and the second peripheral line C2, a caution region R3 between the second peripheral line C2 and the third peripheral line C3, and a region R4 outside the third peripheral line C3 are different from each other. For example, the bird's-eye view image creation unit 42 sets the display magnification in the region R2 to two times, and sets the display magnification in the region R3 to 1.5 times when the display magnifications in the regions R1 and R4 are set to one times.

According to the bird's-eye view image E4 of the further embodiment, the object H2 in the caution region R3 is displayed easy to distinguish, and the object H1 in the warning region R2 is displayed easier to distinguish. Therefore, the objects H1 to H4 detected are displayed larger and easier to distinguish as the degree of requiring caution is increased, so that the bird's-eye view image E4 enables the efficient monitoring of the periphery.

Incidentally, the bird's-eye view image E3 or E4 of the still another embodiment or the further embodiment may include a display of the non-detection region U1 of the another embodiment.

The embodiments of the present invention have been described above. However, the present invention is not limited to the embodiments. For example, in the embodiments, the example in which the display magnification of the region inside the first peripheral line C1 is smaller than the display magnification of the region outside the first peripheral line C1 has been illustrated; however, for example, when the region occupied by the work machine is small relative to the display screen, the display magnification of the region inside the first peripheral line C1 may be set to be large, so that such a bird's-eye view image facilitates confirmation of the vicinity of the turning radius. Further, in the embodiments, the second peripheral line C2 and the third peripheral line C3 which form circles concentric with the turning radius are illustrated as the offset peripheral lines; however, the offset peripheral line may not necessarily form a circle concentric with the turning radius, and may be a peripheral line having various shapes such as a shape in which the width of a location requiring a high degree of caution is increased. In addition, in the embodiments, the example in which displays of the first peripheral line C1 to the third peripheral line C3 are included in the bird's-eye view image has been illustrated; however, the display magnification may be changed without displaying any or all of the peripheral lines. In addition, the boundaries of regions having different display magnifications in the bird's-eye view image may not necessarily coincide with the first peripheral line C1 to the third peripheral line C3, or the display magnification may differ at boundary lines, which are different from the first peripheral line C1 to the third peripheral line C3, as boundaries. For example, the display magnification may differ inside the first peripheral line C1. In addition, the number of the offset peripheral lines may be 1 or 3 or more, and the interval between the first peripheral line C1 (peripheral line) and the second peripheral line C2 and the third peripheral line C3 (offset peripheral lines) is not limited to 1 m or 2 m, and can be appropriately changed.

In addition, in the embodiments, a crawler crane has been illustrated as the work machine, and the work machine according to an embodiment of the present invention may be any work machine, for example, various cranes a truck crane, a wheel crane, and a tower crane, or work machines other than cranes such as a hydraulic excavator as long as the work machine has a turning radius. In addition, in the embodiments, a scanning type distance measurement device and an imaging camera have been illustrated as examples of the detection unit; however, the detection unit may have any configuration as long as the detection unit is configured to be able to acquire data for detecting surrounding objects. In addition, when the imaging camera is configured to acquire a bird's-eye view video as a captured video, a configuration in which the display magnification of each of the above regions is changed in the captured video may be adopted. In addition, changes can be made to the detailed parts illustrated in the embodiments without departing from the concept of the invention.

It should be understood that the invention is not limited to the above-described embodiment, but may be modified into various forms on the basis of the spirit of the invention. Additionally, the modifications are included in the scope of the invention.

What is claimed is:

1. A periphery display device for a work machine, which displays a bird's-eye view image around the work machine,
    wherein a first region and a second region are displayed in the bird's-eye view image,
    wherein the first region is inside a peripheral line whose radius is a turning radius of the work machine, wherein a second region is between the peripheral line and an offset peripheral line whose radius is longer than the turning radius of the work machine, and the second region surrounds the first region, and wherein a first display magnification of the first region is different from a second display magnification of the second region.

2. The periphery display device for a work machine according to claim 1, wherein a third region is displayed in the bird's-eye view image, wherein the third region is outside the offset peripheral line and surrounds the second region, and wherein a third display magnification of third region is different from the display magnification of the second region.

3. The periphery display device for a work machine according to claim 1, wherein the second display magnification of the second region is larger than the first display magnification of the first region.

4. The periphery display device for a work machine according to claim 2, wherein the second display magnification of the second region is larger than the third display magnification of the third region.

5. The periphery display device for a work machine according to claim 1, wherein at least one of the peripheral line and the offset peripheral line is displayed in the bird's-eye view image.

6. The periphery display device for a work machine according to claim 1, wherein a display magnification of the bird's-eye view image differs with at least one of the peripheral line and the offset peripheral line as a boundary.

7. The periphery display device for a work machine according to claim 1, wherein length information indicating a difference in display magnification between the first region and the second region is displayed in the bird's-eye view image.

8. The periphery display device for a work machine according to claim 1, wherein a picture illustrating the work machine is displayed inside the peripheral line of the bird's-eye view image, and the picture illustrating the work machine is changed according to a work status of the work machine.

9. The periphery display device for a work machine according to claim 8, wherein the work machine is a machine to be assembled or disassembled at a worksite, and the picture illustrating the work machine is changed according to an assembly status of the work machine.

10. The periphery display device for a work machine according to claim 8, wherein an outer shape of the picture illustrating the work machine is changed according to an assembly status of the work machine.

11. The periphery display device for a work machine according to claim 8, wherein the picture illustrating the work machine includes information indicating a forward movement or rearward movement direction of the work machine.

12. The periphery display device for a work machine according to claim 1, comprising:

a detection unit that monitors a periphery, wherein a non-detection region of the detection unit is displayed in the bird's-eye view image.

13. The periphery display device for a work machine according to claim 1, further comprising:

a detection unit that monitors a periphery, wherein an object detected by the detection unit is displayed at a display magnification of a region in which the object is detected.

14. The periphery display device for a work machine according to claim 13, wherein the detection unit is a sensor that measures a distance to the object.

15. The periphery display device for a work machine according to claim 1, wherein the second region is displayed to surround a radially outer side of the first region.

* * * * *